United States Patent
Matano et al.

(10) Patent No.: US 7,106,941 B2
(45) Date of Patent: Sep. 12, 2006

(54) SUBSTRATE FOR OPTICAL COMMUNICATION DEVICE, METHOD FOR PRODUCTION THEREOF AND OPTICAL COMMUNICATION DEVICE USING THE SAME

(75) Inventors: Takahiro Matano, Otsu (JP); Satoru Yoshihara, Otsu (JP)

(73) Assignee: Nippon Electronic Glass Co., Ltd., Shiga-Ken (JP)

( * ) Notice: Subject to any disclaimer, the term of this patent is extended or adjusted under 35 U.S.C. 154(b) by 0 days.

(21) Appl. No.: 10/510,943

(22) PCT Filed: Aug. 4, 2004

(86) PCT No.: PCT/JP2004/011501

§ 371 (c)(1),
(2), (4) Date: Mar. 28, 2005

(87) PCT Pub. No.: WO2005/012964

PCT Pub. Date: Feb. 10, 2005

(65) Prior Publication Data

US 2005/0175310 A1    Aug. 11, 2005

(30) Foreign Application Priority Data

Aug. 5, 2003  (JP) .............................. 2003-205935
Jul. 9, 2004   (JP) .............................. 2004-202626

(51) Int. Cl.
*G02B 6/34* (2006.01)
*C03C 10/14* (2006.01)
*C03C 10/12* (2006.01)

(52) U.S. Cl. ..................... 385/147; 385/37; 501/4; 501/7

(58) Field of Classification Search ............... 385/37; 501/4, 7
See application file for complete search history.

(56) References Cited

U.S. PATENT DOCUMENTS

| | | | | |
|---|---|---|---|---|
| 5,591,682 A | * | 1/1997 | Goto ........................... 501/4 |
| 6,011,886 A | | 1/2000 | Abramov et al. ............. 385/37 |
| 6,087,280 A | * | 7/2000 | Beall et al. ..................... 501/7 |
| 6,780,514 B1 | | 8/2004 | Yoshihara et al. .......... 428/429 |
| 2001/0021292 A1 | * | 9/2001 | Merkel ......................... 385/37 |
| 2002/0058578 A1 | * | 5/2002 | Shindo ......................... 501/67 |
| 2003/0054935 A1 | * | 3/2003 | Kitamura et al. .............. 501/4 |

FOREIGN PATENT DOCUMENTS

| | | |
|---|---|---|
| EP | 1048626 | 5/2004 |
| JP | 06-228535 | 8/1994 |
| JP | 10-096827 | 4/1998 |
| JP | 2000-111748 | 4/2000 |
| JP | 2000-503967 | 4/2000 |
| JP | 2000-327372 | 11/2000 |
| JP | 2001-072463 | 3/2001 |
| JP | 2001-172048 | 6/2001 |

(Continued)

*Primary Examiner*—Michelle Connelly-Cushwa
*Assistant Examiner*—Chris Chu
(74) *Attorney, Agent, or Firm*—J.C. Patents (57) ABSTRACT

The optical communication device substrate according to the present invention includes one of ceramic and glass ceramic each having an average thermal expansion coefficient of $-55$ to $-120\times10^{-7}$/C. in the temperature range of $-40$ to $+100°C$. and each containing one of a $\beta$-quartz solid solution and a $\beta$-eucryptite solid solution as a main crystal. In the substrate, maximum thermal expansion hysteresis that occurs when temperature rise from $-40°C$. to $100°C$. at a rate of $1°C$./min and temperature lowering from $-100°C$. to $-40°C$. at a rate of $1°C$./min are performed is less than 12 ppm.

15 Claims, 2 Drawing Sheets

FOREIGN PATENT DOCUMENTS

| | | |
|---|---|---|
| JP | 2001-205747 | 7/2001 |
| JP | 2001-342038 | 12/2001 |
| JP | 2001-356220 | 12/2001 |
| JP | 2002-104841 | 4/2002 |
| JP | 2003-146693 | 5/2003 |
| WO | WO 03014783 | 2/2003 |

* cited by examiner

SUBSTRATE FOR OPTICAL COMMUNICATION DEVICE, METHOD FOR PRODUCTION THEREOF AND OPTICAL COMMUNICATION DEVICE USING THE SAME

FIELD OF THE INVENTION

The present invention relates to an optical communication device substrate having a negative thermal expansion coefficient, a method of manufacturing the same, and an optical communication device obtained by fixing an optical component having a positive thermal expansion coefficient onto the substrate.

RELATED ART

Together with progress in optical communication technology, networks using optical fibers have rapidly improved. In the network, there has been used a wavelength multiplexing technique transmitting light with multiple wavelengths collectively, so that a wavelength filter, a coupler, a waveguide and so on become important optical communication devices.

Some of such optical communication devices have trouble when being used outdoors as a result of changes in characteristics due to changes in temperature; therefore necessity has arisen for the techniques to maintain the characteristics of such optical communication devices at a constant level regardless of changes in temperature, so-called temperature compensation technique (athermalization).

As a typical optical communication device which requires temperature compensation, there is a fiber Bragg grating (hereinafter referred to as FBG). An FBG is an optical communication device having a portion with a profile of a changed refractive index in the form of a grating, so-called grating region, in a core of an optical fiber, and features reflection of light with a specific wavelength according to the relationship represented by the following formula (1). For this reason, this has drawn attention as an important optical communication device in a wavelength division multiplex transmission optical communication system in which optical signals with different wavelengths are multiplexed-transmitted through a single optical fiber.

$$\lambda = 2n\Lambda \quad \text{(Formula 1)}$$

In the formula, $\lambda$ is a reflection wavelength, n is an effective refractive index of a core, and $\Lambda$ is spacing of the region with a changed refractive index in the form of a grating.

However, such an FBG has a problem in that the reflection wavelength varies following the change in ambient temperature. The temperature dependence of the reflection wavelength is represented by the following formula (2), which is obtained by differentiating the formula (1) with respect to the temperature T.

$$\frac{\partial \lambda}{\partial T} = 2\left\{\left(\frac{\partial n}{\partial T}\right)\Lambda + n\left(\frac{\partial \Lambda}{\partial T}\right)\right\} = 2\Lambda\left\{\left(\frac{\partial n}{\partial T}\right) + n\left(\frac{\partial \Lambda}{\partial T}\right)\Big/\Lambda\right\} \quad \text{(formula 2)}$$

The second term on the right side of the formula (2), $(\delta\Lambda/\delta T)/\Lambda$, corresponds to a thermal expansion coefficient of an optical fiber, and the value of the thermal expansion coefficient is approximately $0.6 \times 10^{-6}/°C$. On the other hand, the first term on the right side is the temperature dependence of a refractive index in a core portion of an optical fiber, and the value of the dependence is approximately $7.5 \times 10^{-6}/°C$. That is, while the temperature dependence of the reflection wavelength is dependent on both the change in refractive index in a core portion and the change in spacing of the grating due to thermal expansion, the change in reflection wavelengths is mainly found to be caused by the change in refractive index with temperature.

As means for preventing changes in reflection wavelength, a method has been known in which tension adapted to a change in temperature is applied to an FBG to vary spacing of grating region, thereby canceling a factor caused by change in refractive index.

Disclosed as specific examples of such means are a device in which an FBG applied with a predetermined tension is bonded and fixed to a glass ceramic substrate having a negative thermal expansion coefficient obtained by crystallizing a primary glass body formed in advance into a plate shape, to thereby control the tension of the FBG (see, for example, JP 2000-503967 A), and a device in which an FBG applied with predetermined tension is bonded and fixed to a ceramic substrate having a negative thermal expansion coefficient obtained by sintering ceramic to thereby control the tension of the FBG (see, for example, JP 2003-146693 A)

In each of the above devices, the ceramic substrate or the glass ceramic substrate shrinks with increasing temperature, to thereby reduce the tension applied to the grating region of an optical fiber. On the other hand, with decreasing temperature, the ceramic substrate or the glass ceramic substrate expands to increase the tension applied to the grating region of the optical fiber. Thus, the tension applied to an FBG causes changes according to changes in temperature thereby enabling a spacing of the grating in the grating region to be adjusted, with the result that the temperature dependence of a center reflective wavelength can be cancelled.

Each of the glass ceramic substrate and the ceramic substrate having a negative thermal expansion coefficient described in JP 2000-503967 A and JP 2003-146693 A enables temperature compensation to be performed through the simple mechanism because the substrate is made up of a single member. However, in such a device, a maximum difference between the dimension at the time of temperature rise and the dimension at the time of temperature lowering (thermal expansion hysteresis) is large. If any one of those glass ceramic substrate and ceramic substrate is used as an optical communication device substrate and an FBG as an optical component having a positive thermal expansion coefficient is fixed onto the substrate, the dimension of the optical communication device substrate varies depending on the rate of temperature variation. In this case, the center reflective wavelength by the FBG does not become stable. There arises a problem in that the resultant device cannot exert stable performance.

SUMMARY OF THE INVENTION

An object of the present invention is to provide an optical communication device substrate having a negative thermal expansion coefficient necessary for temperature compensation techniques and exhibiting small thermal expansion hysteresis, a method of manufacturing the same, and an optical communication device using the same.

The inventors of the present invention have found that thermal expansion hysteresis can be reduced by performing, on ceramic or glass ceramic having a negative thermal expansion coefficient, low temperature treatment and high temperature treatment alternately, each of the low temperature treatment and the high temperature treatment being performed multiple times, thereby proposing the present invention.

That is, according to the present invention, there is provided an optical communication device substrate, including one of ceramic and glass ceramic each having an average thermal expansion coefficient of −55 to −120×10$^{-7}$°/C. in the temperature range of −40 to +100°C. and each containing one of a β-quartz solid solution and a β-eucryptite solid solution as a main crystal, in which maximum thermal expansion hysteresis that occurs when temperature rise from −40°C. to 100°C. at a rate of 1°C./min and temperature lowering from 100°C. to −40°C. at a rate of 1°C./min are performed is less than 12 ppm.

Further, according to the present invention, there is provided a method of manufacturing an optical communication device substrate, the substrate including one of ceramic and glass ceramic each having an average thermal expansion coefficient of −55 to −120°×10$^{-7}$/C. in the temperature range of −40 to +100°C. and each containing one of a β-quartz solid solution and a β-eucryptite solid solution as a main crystal, the method including performing, on the substrate, high temperature treatment at the temperature of 20°C. or higher and low temperature treatment at the temperature of 20°C. or lower alternately, each of the high temperature treatment and the low temperature treatment being performed multiple times, in which the difference between the temperature at which the high temperature treatment is performed and the temperature at which the low temperature treatment is performed is in the range of 40 to 240°C.

Further, according to the present invention, there is provided an optical communication device obtained by fixing an optical component having a positive thermal expansion coefficient onto an optical communication device substrate, the substrate including one of ceramic and glass ceramic each having an average thermal expansion coefficient of −55 to −120°×10$^{-7}$/C. in the temperature range of −40 to +100°C. and each containing one of a β-quartz solid solution and a β-eucryptite solid solution as a main crystal, in which maximum thermal expansion hysteresis that occurs when temperature rise from −40° C. to 100° C. at a rate of 1° C./min and temperature lowering from 100° C. to −40° C. at a rate of 1° C./min are performed is less than 12 ppm.

The optical communication device substrate according to the present invention includes one of ceramic and glass ceramic each having an average thermal expansion coefficient of −55 to −120×10$^{-7}$/C.° in the temperature range of −40 to +100 C.° and each containing one of a β-quartz solid solution and a β-eucryptite solid solution as a main crystal, and maximum thermal expansion hysteresis that occurs when temperature rise from −40 C.° to 100 C.° at a rate of 1 C.°/min and temperature lowering from 100 C.° to −40 C.° at a rate of 1 C.°/min are performed is less than 12 ppm. Therefore, center reflective wavelength hysteresis of an optical communication device fixed onto the substrate can be suppressed to 20 pm or less.

In addition, the optical communication device substrate according to the present invention can reduce a change in an average thermal expansion coefficient in the temperature range of −40 to 100 C.° and in thermal expansion hysteresis even when the substrate is exposed to a high-temperature and high-humidity atmosphere for a long period of time.

DESCRIPTION OF THE PREFERRED EMBODIMENTS

An optical communication device substrate according to the present invention can cancel the temperature dependence of an optical communication device and can be used as a member for temperature compensation in an optical component because the substrate has a negative average thermal expansion coefficient of −55 to −120°× 10$^{-7/C.in\ the\ temperature\ range\ of\ -}$ 40 to +100°C. The substrate cannot cancel the temperature dependence of an optical component having a positive thermal expansion coefficient if the thermal expansion coefficient is negative and its absolute value is smaller than that of −55°×10$^{-7}$/C. in the temperature range of −40 to +100°C. of the coefficient is positive in the same temperature range, or if the coefficient is negative and its absolute value is greater than that of −120°×10$^{-7}$/C. in the same temperature range. As a result, the substrate cannot be as a member for temperature compensation in an optical component.

In addition, the optical communication device substrate according to the present invention has a sufficient mechanical strength and is excellent in machinability because the substrate includes one of ceramic and glass ceramic each containing one of a β-quartz solid solution and a β-eucryptite solid solution as a main crystal. Thus, the substrate can be formed into a desired shape with ease.

An easily processable shape of the optical communication device substrate is a prism shape, a columnar shape, a cylindrical shape, or a flat plate shape. When the substrate is of a prism shape, a columnar shape, or a flat plate shape, a slit may be arranged over the whole length of the substrate in order to fix an optical component.

In the optical communication device substrate according to the present invention, if a difference between the maximum value and the minimum value out of the average thermal expansion coefficients calculated for each of 7 sections, the sections being obtained by dividing the temperature range of −40 C.° to 100°C. every 20°C., is 6°×10$^{-7}$/C. or less when the temperature is lowered from 100°C. to −40°C. at a rate of 1°C./min, maximum thermal expansion hysteresis that occurs when temperature rise from −40°C. to 100°C. at a rate of 1°C./min and temperature lowering from 100°C. to −40°C. at a rate of 1°C./min are performed tends to be less than 12 ppm.

It is preferable that the optical communication device substrate according to the present invention contains 45 to 60 mass % $SiO_2$, 20 to 45 mass % $Al_2O_3$, 7 to 12 mass % $Li_2O$, 0 to 4 mass % $TiO_2$, and 0 to 4 mass % $ZrO_2$ because the degree of crystallinity of the β-quartz solid solution or of the β-eucryptite solid solution can increase. It is particularly preferable that a molar ratio of $Li_2O: Al_2O_3: SiO_2$ be 1:1.5 to 2.5:2 to 3.

Described below is the reason why the composition range is limited as described above.

$SiO_2$ is a main component of the main crystal having a negative thermal expansion coefficient. A $SiO_2$ content of less than 45% tends to result in an insufficient precipitation amount of the main crystal. A $SiO_2$ content in excess of 60% tends to result in the precipitation of a crystalline phase except a desired main crystalline phase. Therefore, the $SiO_2$ content is in the range of 45 to 60%, preferably in the range of 46 to 59%.

$Al_2O_3$ is also a main component of the main crystal having a negative thermal expansion coefficient. An $Al_2O_2$ content of less than 20% tends to result in an insufficient precipitation amount of the main crystal. An $Al_2O_3$ content in excess of 45% tends to result in the precipitation of a crystalline phase except a desired main crystalline phase. Therefore, the $Al_2O_3$ content is in the range of 20 to 45%, preferably in the range of 21 to 44%.

$Li_2O$ is also a main component of the main crystal having a negative thermal expansion coefficient. A $Li_2O$ content of less than 7% tends to result in an insufficient precipitation amount of the main crystal. A $Li_2O$ content in excess of 12% tends to result in the precipitation of a crystalline phase except a desired main crystalline phase. Therefore, the $Li_2O$ content is in the range of 7 to 12%, preferably in the range of 7.5 to 11.5%.

Each of $SiO_2$, $Al_2O_3$, and $Li_2O$ is a main component of the β-quartz solid solution or of the β-eucryptite solid solution having a negative thermal expansion coefficient, and the molar ratio of $Li_2O:Al_2O_3$: $SiO_2$ is 1:1.5 to 2.5:2 to 3. The precipitation amount of the main crystal tends to be high in this range. A molar ratio out of this range makes it difficult to obtain a negative thermal expansion coefficient the absolute value of which is large.

Each of $ZrO_2$ and $TiO_2$ acts as a nucleating agent. However, a content of each of $ZrO_2$ and $TiO_2$ in excess of 4% leads to the presence of an excess component, which does not act as a nucleating agent, and causes the deterioration of a bending strength. Therefore, the content of each of $ZrO_2$ and $TiO_2$ is in the range of 0 to 4%, preferably in the range of 0.5 to 3%.

In addition to the above components, up to 10% or less of another component such as an alkali earth component (for example, MgO, BaO, or ZnO) or an alkali component (for example, $Na_2O$ or $K_2O$) can be added.

In addition, the optical communication device substrate according to the present invention is preferably obtained through treatment with a solution containing one kind or two or more kinds of organosilicon compounds selected from the group consisting of silane compounds, siloxane compounds, and silazane compounds because the thermal expansion coefficient of the substrate hardly changes even when the substrate is exposed to a high-temperature and high-humidity atmosphere for a long period of time, and thermal expansion hysteresis can be easily reduced.

The method of manufacturing an optical communication device substrate, the substrate including one of ceramic and glass ceramic each having an average thermal expansion coefficient of $-55$ to $-120°\times10^{-7}/C$. in the temperature range of $-40$ to $+100°C$. and each containing one of a β-quartz solid solution and a β-eucryptite solid solution as a main crystal, includes performing, on the substrate, high temperature treatment at the temperature of 20°C. or higher and low temperature treatment at the temperature of 20°C. or lower alternately, each of the high temperature treatment and the low temperature treatment being performed multiple times. In this method, the difference between the temperature at which the high temperature treatment is performed and the temperature at which the low temperature treatment is performed is in the range of 40 to 240° C. Therefore, it becomes possible to obtain an optical communication device substrate exhibiting small thermal expansion hysteresis and showing small change in thermal expansion coefficient or in thermal expansion hysteresis even when the substrate is exposed to the high-temperature and high-humidity atmosphere for a long period of time. In particular, when low temperature treatment at the temperature of $-40°C$. or lower and high temperature treatment in the temperature range of 20 to 200°C. are performed on the substrate alternately, each of the low temperature treatment and the high temperature treatment being performed multiple times, maximum thermal expansion hysteresis that occurs when temperature rise from $-40°C$.to $100°C$.at a rate of 1°C./min and temperature lowering from 100°C. to $-40°C$. at a rate of 1°C./min are performed can be less than 12 ppm. The order in which the low temperature treatment and the high temperature treatment are performed is arbitrary.

The ceramic or the glass ceramic each containing the β-quartz solid solution or the β-eucryptite solid solution as a main crystal contains as a main component an aggregate (polycrystalline substance) of multiple crystalline particles composed of the β-quartz solid solution or of the β-eucryptite solid solution each having a negative thermal expansion coefficient the absolute value of which is large. The β-quartz solid solution or the β-eucryptite solid solution is a crystal having an anisotropic thermal expansion coefficient (the thermal expansion coefficient in a c-axis direction is negative and the thermal expansion coefficient in an a-axis direction is positive). Therefore, distortion due to anisotropy partially forms grain boundary voids in the grain boundary of the crystalline particles. Expansion or shrinkage of the crystalline particles in the a-axis direction at the time of temperature change is canceled by the grain boundary voids. However, the ceramic or the glass ceramic will have a negative thermal expansion coefficient the absolute value of which is large because the thermal expansion coefficient in the c-axis direction mainly governs the thermal expansion coefficient of the ceramic or of the glass ceramic.

The thermal expansion hysteresis refers to a phenomenon in which a thermal expansion curve at the time of temperature rise does not correspond to a thermal expansion curve at the time of temperature lowering. The grain boundary voids are debonded at the time of temperature lowering by the shrinkage of the crystalline particles in the a-axis direction (the volumes of the grain boundary voids increase), while the voids are bonded at the time of temperature rise by the expansion of the crystalline particles in the a-axis direction (the volumes of the grain boundary voids reduce). The thermal expansion hysteresis occurs in the ceramic or the glass ceramic each containing the β-quartz solid solution or the β-eucryptite solid solution as a main crystal probably because the dissociation of the grain boundary voids cannot be performed smoothly and cannot follow the temperature chance. Friction at the void of grain boundary surface may be attributed to the fact that the dissociation of the grain boundary voids cannot be performed smoothly.

When high temperature treatment at the temperature of 20°C. or higher and low temperature treatment at the temperature of 20 C.° or lower are performed alternately, the high temperature treatment and the low temperature treatment being performed multiple times, and a difference between the temperature at which the high temperature treatment is performed and the temperature at which the low temperature treatment is performed is in the range of 60 to 240° C., particularly when low temperature treatment at the temperature of −40°C. or lower and high temperature treatment in the temperature range of 20 to 200°C. are performed alternately, the low temperature treatment and the high temperature treatment being performed multiple times, no new grain boundary surface is formed in the grain boundary voids in the temperature range for the measurement of thermal expansion hysteresis and friction at the grain boundary surface of a grain boundary void can be reduced. As a result, the thermal expansion hysteresis becomes small. In other words, temperature rise from the low-temperature-treatment temperature to the high-temperature-treatment temperature or temperature lowering from the high-temperature-treatment temperature to the low-temperature-treatment temperature is repeated, so that the bonding and dissociation of the grain boundary voids are repeated. As a result, the grain boundary surfaces of the grain boundary voids rub each other to be smooth, thereby resulting in reduced friction. Therefore, the thermal expansion hysteresis becomes small.

When the difference between the temperature at which the high temperature treatment is performed and the temperature at which the low temperature treatment is performed is less than 60° C., the effect of making the grain boundary surfaces smooth owing to the rubbing of the grain boundary surfaces with each other is small. When the difference is greater than 240° C., the effect of making the grain boundary surfaces smooth owing to the rubbing of the surfaces with each other does not increase. Moreover, in this case, the temperature rise or the temperature lowering takes a long time, resulting in poor productivity and poor economical efficiency.

It is not preferable that the low-temperature-treatment temperature be higher than the minimum temperature at the time of the measurement of thermal expansion hysteresis, specifically higher than −40° C. This is because a new grain boundary surface which is not smooth is formed in the grain boundary voids at the time of the measurement of thermal expansion hysteresis, thereby increasing friction between the grain boundary surfaces of the grain boundary voids.

In addition, when the high-temperature-treatment temperature is lower than 20° C., the grain boundary surfaces of the grain boundary voids hardly rub each other at the time of temperature rise or of temperature lowering, so that the friction between the grain boundary surfaces of the grain boundary voids hardly reduces. When the high-temperature-treatment temperature is higher than 200° C., the grain boundary surfaces of the grain boundary voids rub each other at the time of temperature rise or of temperature lowering, but the effect of rubbing does not increase even if the high-temperature-treatment temperature is further increased. Moreover, in this case, the temperature rise or the temperature lowering takes a long time, resulting in poor productivity and poor economical efficiency.

In addition, when the low temperature treatment at the temperature of −40° C. or lower and the high temperature treatment in the temperature range of 20 to 200° C. are performed alternately and each of them is performed only once, the number of times of rubbing of the grain boundary surfaces of the grain boundary voids with each other is small, so that the friction between the surfaces of the grain boundary voids hardly reduces.

Each of a time for one isothermal retention at the temperature of −40°C. or lower and a time for one isothermal retention in the temperature range of 20 to 200°C. is 60 minutes or less, preferably in the range of 1 to 30 minutes. Even if heat treatment is performed for more than 60 minutes, the effect of reducing the friction between the grain boundary surfaces of the grain boundary voids does not increase, thereby resulting in poor productivity and poor economical efficiency.

The method of manufacturing an optical communication device substrate according to the present invention preferably includes treating the substrate with a solution containing one kind or two or more kinds of organosilicon compounds selected from the group consisting of silane compounds, siloxane compounds, and silazane compounds because the thermal expansion coefficient of the substrate hardly changes even when the substrate is exposed to high-temperature and high-humidity atmosphere for a long period of time, and thermal expansion hysteresis can be easily reduced. The order in which the low temperature treatment at the temperature of −40°C. or lower, the high temperature treatment in the temperature range of 20 to 200°C., and the treatment with a solution containing an organosilicon compound are performed on the substrate is arbitrary.

In the method of manufacturing an optical communication device substrate according to the present invention, when the low temperature treatment or the high temperature treatment is performed on the substrate in an atmosphere with the moisture pressure lower than the saturated moisture pressure at 0°C., neither dewdrop nor frost occurs. Because moisture like dewdrop or frost dose not adhere to the substrate, the grain boundary surfaces of grain boundary voids are not prevented from rubbing each other by moisture. So, it is easy to reduce the friction between the grain boundary surfaces of grain boundary voids.

In addition, in the method of manufacturing an optical communication device substrate according to the present invention, the atmosphere in which the substrate is treated at the low or high temperature is preferably a helium gas atmosphere because heat can be easily transferred through the substrate.

The optical communication device according to the present invention is obtained by fixing an optical component having a positive thermal expansion coefficient (for example, FBG) onto an optical communication device substrate, the substrate including one of ceramic and glass ceramic each having an average thermal expansion coefficient of −55 to −120×10$^{-7}$/C. in the temperature range of −40 to +100°C. and each containing one of a β-quartz solid solution and a β-eucryptite solid solution as a main crystal. In the optical communication device, maximum thermal expansion hysteresis that occurs when temperature rise from −40°C. to 100°C. at a rate of 1 C.°/min and temperature lowering from 100°C. to −40°C.at a rate of 1°C./min are performed is less than 12 pm. Therefore, the center reflective wavelength hysteresis of the optical communication device can be suppressed to 20 pm or less.

In the optical communication device according to the present invention, examples of an adhesive used for fixing an optical component having a positive thermal expansion coefficient onto the optical communication device substrate according to the present invention include glass, a polymer adhesive, and a metal. Of those, a polymer adhesive is preferably used because the adhesive is inexpensive, can strongly fix the optical component on the substrate, and can provide an optical communication device with high efficiency. Specifically, an epoxy-based adhesive is suitably used. A silicone-based adhesive and an acrylic adhesive are also available.

EXAMPLES

Hereinafter, the present invention will be described in detail by way of examples and comparative examples.

Figure 1:
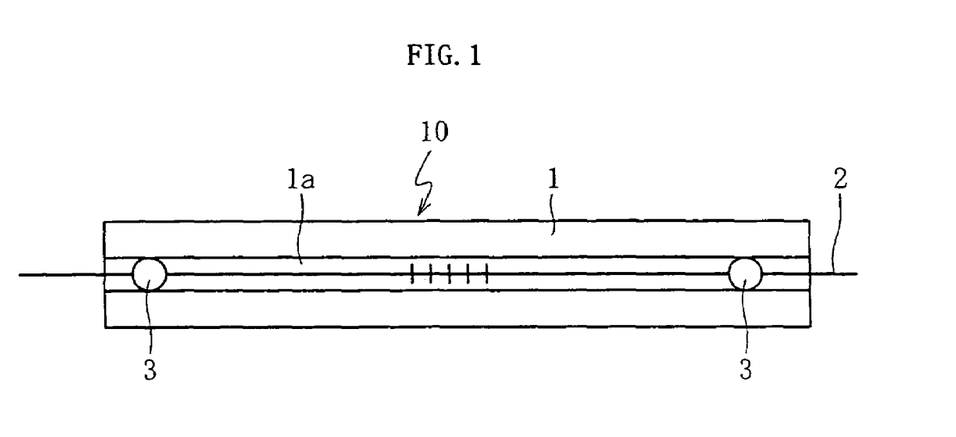
FIG. 1 is a plane view showing an optical communication device according to an example of the present invention.
Figure 2:
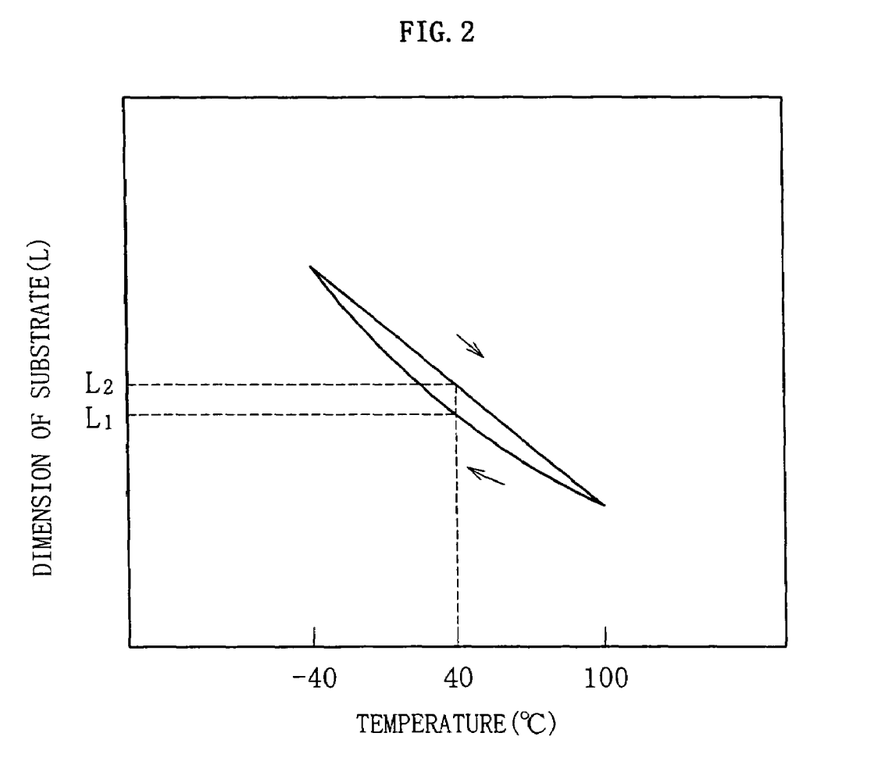
FIG. 2 is a graph showing thermal expansion hysteresis of a substrate in the temperature range of −40 to 100° C.
Figure 3:
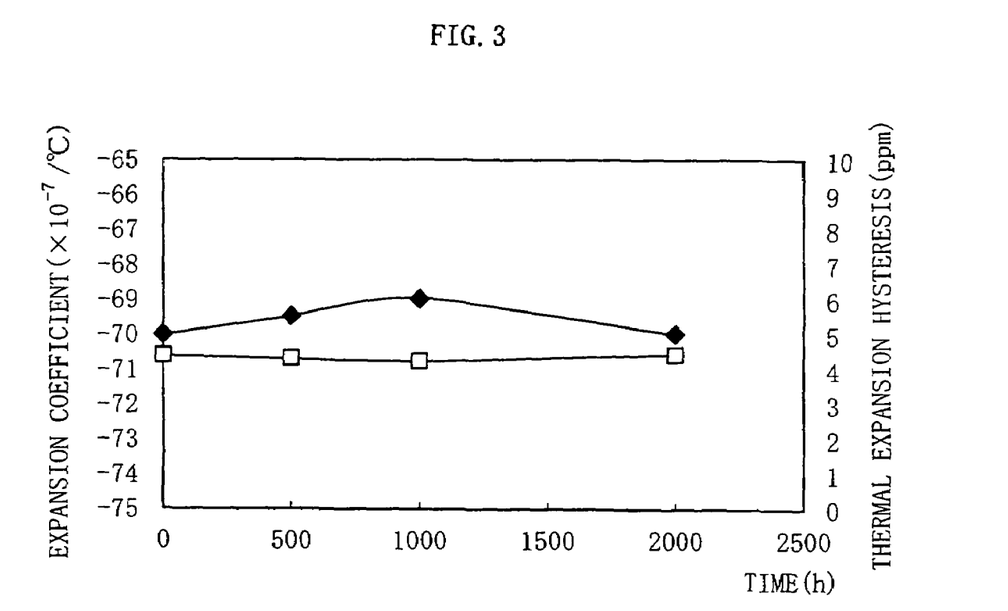
FIG. 3 is a graph showing results of an average thermal expansion coefficient and thermal expansion hysteresis in a long-term durability test of Example 8.
Figure 4:
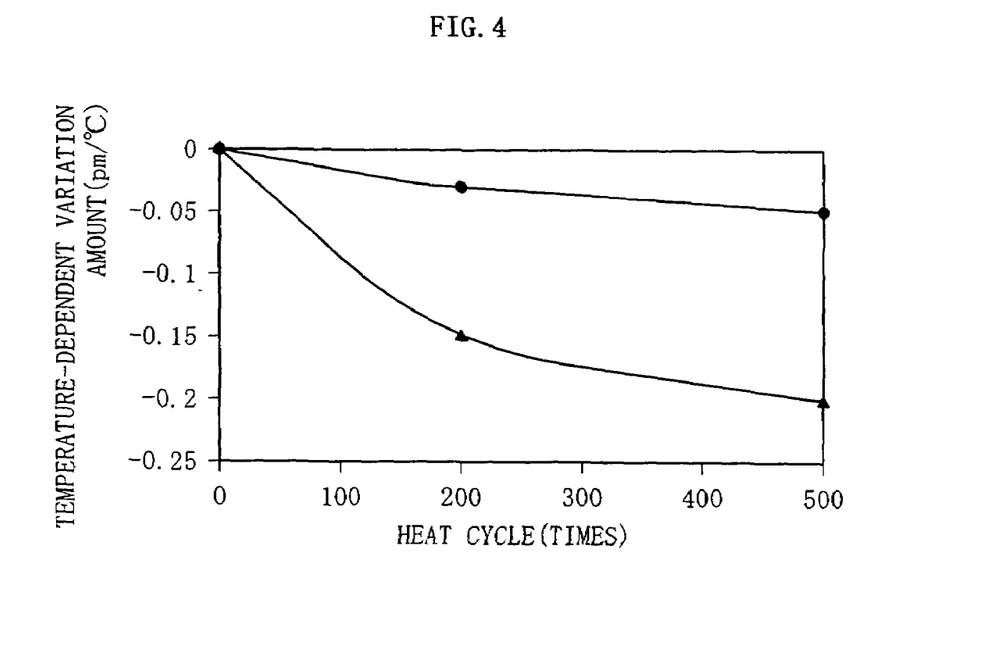
FIG. 4 is a graph showing results of long-term durability tests (temperature cycle tests) of Example 6 and Comparative Example 1.

Tables 1 and 2 show Examples 1 to 10 of the present invention, and Table 3 shows Comparative Examples 1 to 6. FIG. 1 is a plan view showing an optical communication device according to an example of the present invention. FIG. 2 is a graph showing thermal expansion hysteresis of a substrate in the temperature range of −40 to +100° C. FIG. 3 is a graph showing results of an average thermal expansion coefficient (□) and thermal expansion hysteresis (♦) in a long-term durability test of Example 8. FIG. 4 is a graph showing results of long-term durability tests (temperature cycle tests) of Example 6 (●) and Comparative Example 1 (▲).

The substrate 1 was dipped into an isopropyl alcohol (IPA) solution containing a siloxane compound represented by $\{R^1Si(OH)_a(OCH_3)_bO_{(m-1)/m}\}_m$. After ultrasonic vibration had been applied to the substrate for 10 minutes, the substrate was dried at +100° C. for 10 minutes. In the siloxane compound, $R^1$ represents $C_6H_{13}$, a represents 0.07, b represents 1.88, and m represents 2.1.

Subsequently, the substrate 1 was treated on a thermo-hydrostat (manufactured by Hitachi: EC-13MHP) according to the treatment temperatures, the isothermal retention times, and the number of times of treatment shown in Tables 1 and 2.

TABLE 1

|  | Example 1 | Example 2 | Example 3 | Example 4 | Example 5 |
|---|---|---|---|---|---|
| Substrate | Ceramic (A) | Ceramic (A) | Ceramic (A) | Ceramic (A) | Ceramic (A) |
| Li2O:Al2O3:SiO2 molar ratio | 1:1:2.9 | 1:1:2.9 | 1:1:2.9 | 1:1:2.9 | 1:1:2.9 |
| Low-temperature-treatment temperature (° C.) | −40 | −40 | −40 | −40 | −40 |
| Isothermal retention time (min) | 3 | 3 | 30 | 30 | 30 |
| High-temperature-treatment temperature (° C.) | 20 | 100 | 100 | 100 | 100 |
| Isothermal retention time (min) | 3 | 3 | 30 | 30 | 30 |
| Number of times of treatment | 2 | 2 | 2 | 5 | 10 |
| Average thermal expansion coefficient (×10$^{-7}$/° C.) | −81 | −81 | −81 | −72 | −82 |
| Thermal expansion hysteresis (ppm) | 11 | 9 | 7 | 5 | 4 |
| Difference in average thermal expansion coefficient every 20° C. (×10$^{-7}$/° C.) | 6.0 | 6.0 | 5.0 | 5.0 | 4.5 |
| Wavelength hysteresis (pm) | 16.5 | 13.5 | 10.5 | 7.5 | 6.0 |

TABLE 3

|  | Comparative Example 1 | Comparative Example 2 | Comparative Example 3 | Comparative Example 4 | Comparative Example 5 | Comparative Example 6 |
|---|---|---|---|---|---|---|
| Substrate | Ceramic (A) | Ceramic (C) | Ceramic (D) | Ceramic (A) | Ceramic (A) | Ceramic (A) |
| Li2O:Al2O3:SiO2 molar ratio | 1:1:2.9 | 1:1.3:2.5 | 1:1.1:3.2 | 1:1:2.9 | 1:1:2.9 | 1:1:2.9 |
| Low-temperature-treatment temperature (° C.) | — | — | — | 30 | 0 | −40 |
| Isothermal retention time (min) | — | — | — | 3 | 3 | 1440 |
| High-temperature-treatment temperature (° C.) | — | — | — | 100 | 40 | 100 |
| Isothermal retention time (min) | — | — | — | 3 | 3 | 1440 |
| Number of times of treatment | — | — | — | 5 | 5 | 1 |
| Average thermal expansion coefficient (×10$^{-7}$/° C.) | −80 | −75 | −70 | −80 | −80 | −80 |
| Thermal expansion hysteresis (ppm) | 25 | 21 | 20 | 23 | 20 | 16 |
| Difference in average thermal expansion coefficient every 20° C. (×10$^{-7}$/° C.) | 8.0 | 8.0 | 8.0 | 8.0 | 7.5 | 7.5 |
| Wavelength hysteresis (pm) | 37.5 | 31.5 | 30.0 | 34.5 | 30.0 | 24.0 |

First of all, in each of Examples 1 to 6, powder was sintered in such a way that the composition after the sintering would be 55.0 mass % $SiO_2$, 33.1 mass % $Al_2O_3$, 9.4 mass % $Li_2O$, 0.8 mass % $TiO_2$, 1.0 mass % $ZrO_2$, 0.2 mass % MgO, and 0.5 mass % $P_2O_5$. As a result, a substrate 1 made of ceramic (A) containing a β-quartz solid solution as a main crystal was prepared.

As shown in FIG. 1, the substrate 1 measures 40 mm long by 4 mm wide by 3 mm thick, and a slit 1a with a depth of 0.6 mm is formed over the entire top surface of the substrate.

When each of the low temperature treatment at the temperature of −40° C. or lower and the high temperature treatment in the temperature range of 20 to 200° C. was performed once, the number of times of treatment was counted as 1.

Finally, an FBG 2 was inserted into the slit 1a of each substrate

TABLE 2

|  | Example 6 | Example 7 | Example 8 | Example 9 | Example 10 |
|---|---|---|---|---|---|
| Substrate | Ceramic (A) | Ceramic (B) | Ceramic (C) | Ceramic (D) | Glass ceramic (E) |
| Li2O:Al2O3:SiO2 molar ratio | 1:1:2.9 | 1:1:3 | 1:1.3:2.5 | 1:1.1:3.2 | 1:1.3:2.5 |
| Low-temperature-treatment temperature (° C.) | −40 | −40 | −40 | −40 | −40 |
| Isothermal retention time (min) | 30 | 30 | 30 | 30 | 30 |
| High-temperature-treatment temperature (° C.) | 20 | 100 | 100 | 100 | 100 |
| Isothermal retention time (min) | 30 | 30 | 30 | 30 | 30 |
| Number of times of treatment | 5 | 5 | 5 | 5 | 5 |
| Average thermal expansion coefficient (×10$^{-7}$/° C.) | −82 | −77 | −71 | −65 | −70 |
| Thermal expansion hysteresis (ppm) | 9 | 3.5 | 4 | 4 | 11 |
| Difference in average thermal expansion coefficient every 20° C. (×10$^{-7}$/° C.) | 4.5 | 5.0 | 5.0 | 5.0 | 5.5 |
| Wavelength hysteresis (pm) | 13.5 | 5.5 | 6.0 | 6.0 | 16.5 |

1. The FBG 2 was bonded and fixed to the substrate 1 at 2 points near both the ends of the substrate 1 with an epoxy-based adhesive 3 (XOC-02THK available from Kyoritsu Chemical & Co., Ltd.), to thereby prepare an optical communication device 10. The FBG 2 was bonded to the substrate 1 by irradiating ultraviolet light to the epoxy-based adhesive 3. The ultraviolet light has wavelengths in he range of 300 to 400 nm by a metal halide lamp having an output of 3,200 mW/cm$^2$.

In Example 7, a substrate and an optical communication device were prepared in the same manner as in Example 4 except that powder was sintered in such a way that the composition after the sintering would be 55.5 mass % SiO$_2$, 32.6 mass % Al$_2$O$_3$, 9.2 mass % Li$_2$O, 0.9 mass % TiO$_2$, 1.0 mass % ZrO$_2$, 0.2 mass % MgO, and 0.5 mass % P$_2$O$_5$, to thereby prepare ceramic (B) containing a β-quartz solid solution as a main crystal.

In Example 8, a substrate and an optical communication device were prepared in the same manner as in Example 4 except that powder was sintered in such a way that the composition after the sintering would be 56.0 mass % SiO$_2$, 32.1 mass % Al$_2$O$_3$, 9.0 mass % Li$_2$O, 0.9 mass % TiO$_2$, 1.1 mass % ZrO$_2$, 0.2 mass % MgO, and 0.7 mass % P$_2$O$_5$, to thereby prepare ceramic (C) containing a β-quartz solid solution as a main crystal.

In Example 9, a substrate and an optical communication device were prepared in the same manner as in Example 4 except that powder was sintered in such a way that the composition after the sintering would be 56.0 mass % SiO$_2$, 32.6 mass % Al$_2$O$_3$, 8.6 mass % Li$_2$O, 0.9 mass % TiO$_2$, 1.1 mass % ZrO$_2$, 0.3 mass % MgO, and 0.5 mass % P$_2$O$_5$, to thereby prepare ceramic (D) containing a β-quartz solid solution as a main crystal.

In Example 10, a substrate and an optical communication device were prepared in the same manner as in Example 4 except the following. That is, raw materials were blended in such a way that the composition would be 46.2 mass % SiO$_2$, 40.9 mass % Al$_2$O$_3$, 9.1 mass % Li$_2$O, 2.0 mass % TiO$_2$, and 1.8 mass % ZrO$_2$. After that, the mixture was melted at 1,200° C. for 7 hours, and then quenched to prepare glass. Then, the glass was heated at 1,350° C. for 15 hours to prepare glass ceramic (E) from which a β-quartz solid solution was precipitated as a main crystal.

In Comparative Example 1, a substrate and an optical communication device were prepared in the same manner as in each of Examples 1 to 6 except that neither low temperature treatment nor high temperature treatment was performed.

In Comparative Example 2, a substrate and an optical communication device were prepared in the same manner as in Example 8 except that neither low temperature treatment nor high temperature treatment was performed.

In Comparative Example 3, a substrate and an optical communication device were prepared in the same manner as in Example 9 except that neither low temperature treatment nor high temperature treatment was performed.

In each of Comparative Examples 4 to 6, a substrate and an optical communication device were prepared in the same manner as in each of Examples 1 to 6 except that heat treatment was performed according to a temperature-retention time shown in Table 3.

The average thermal expansion coefficient and thermal expansion hysteresis of a substrate in the temperature range of −40 to +100° C. were measured by a dilatometer (manufactured by Mac Science). As shown in FIG. 2, each of temperature rise and temperature lowering was performed in the temperature range of −40 to 100° C. at a rate of 1° C./min. The dimension L$_1$ at the time of cooling at 40° C. and the dimension L$_2$ at the time of heating at 40° C. were measured, and the difference between L$_1$ and L$_2$ (|L$_1$−L$_2$|) was divided by the dimension L measured at room temperature. The resultant value is the thermal expansion hysteresis.

A difference in average thermal expansion coefficient every 20° C. was determined as follows. The thermal expansion curve obtained when the temperature lowering was performed in the temperature range of −40 to 100° C. at a rate of 1° C./min as shown in FIG. 2 was divided into 7 sections every 20° C. After the average thermal expansion coefficient in each section had been calculated, the difference between the maximum value and the minimum value out of the average thermal expansion coefficients was determined.

The wavelength hysteresis of a prepared optical communication device was determined as follows. Each of the temperature rise and the temperature lowering was performed on the optical commuinication device in the temperature range of −40 to 100° C. at a rate of 1° C./min. A center wavelength appearing in the vicinity of 1,550 nm out of the wavelengths of light reflected by the FBG was precisely measured by a spectrum analyzer (Q-8384 manufactured by Advantest Corporation) up to a pm order. Then, the difference between the center wavelength and the wavelength at 35° C. was determined.

A substrate was evaluated for long-term durability as follows. The substrate was left to stand in a high-temperature and high-humidity atmosphere of 85° C. and 85% for 2,000 hours. Then, the thermal expansion coefficient and thermal expansion hysteresis of the substrate were measured with time.

An optical communication device was evaluated for long-term reliability as follows (temperature cycle test). The following temperature cycle was performed up to 500 times. In the temperature cycle, the temperature was lowered from room temperature (20° C.) to −40° C. at a rate of 1° C./min, held at −40° C. for 30 minutes, increased to 85° C. at a rate of 1° C./min, held at 85° C. for 30 minutes, and lowered to room temperature (20° C.) at a rate of 1° C./min. A center wavelength in the vicinity of 1,550 nm when the temperature cycle was performed 0, 200, or 500 times was precisely measured by a spectrum analyzer (Q-8384 manufactured by Advantest Corporation) up to a pm order. A variation amount of the wavelength due to the temperature variation from −40° C. to 85° C. was calculated as a temperature-dependent variation amount. The difference between the variation amount when the temperature cycle was not performed and the variation amount when the temperature cycle was performed 200 or 500 times was evaluated.

As is apparent from Tables 1 and 2, in each of Examples 1 to 10, the optical communication device had an average thermal expansion coefficient of −65 to −81×$10^{-7}$/C. in the temperature range of −40 to 100°C., the optical communication device substrate had a difference in average thermal expansion every 20° C. of 6×$10^{-7}$/C.° or less, and thermal expansion hysteresis was small (11 ppm or less). As a result, the center reflective wavelength hysteresis was also small (16.5 pm or less).

As is apparent from FIG. 3, the optical communication device substrate of Example 8 showed a small change in average thermal expansion coefficient or in thermal expansion hysteresis even when the substrate was left to stand in a high-temperature and high-humidity atmosphere for a long period of time. As in the case of the substrate of Example 8, the substrate of each of Examples 1 to 7 and 9 and 10 showed a small change in an average thermal expansion coefficient or in thermal expansion hysteresis even when the substrate was left to stand in high-temperature and high-humidity atmosphere for a long period of time.

As is apparent from FIG. 4, the optical communication device of Example 6 had a small temperature-dependent variation amount even when the temperature cycle test as he long-term reliability test was performed. As in the case of the optical communication device of Example 6, the optical communication device of each of Examples 1 to 5 and 7 to 10 had a small temperature-dependent variation amount even when the temperature cycle test as the long-term reliability test was performed.

As is apparent from Table 3, neither low temperature treatment nor high temperature treatment was performed on the optical communication device of each of Comparative Examples 1 to 3. As a result, the thermal expansion hysteresis of the optical communication device substrate was large (20 ppm or more), and the center reflective wavelength hysteresis of the optical communication device was also large (30 pm or more). In addition, no low temperature treatment in the low temperature range of −40° C. or lower was performed on the optical communication device of each of Comparative Examples 4 and 5. As a result, the thermal expansion hysteresis of the optical communication device substrate was large (20 ppm or more), and the center reflective wavelength hysteresis of the optical communication device was also large (30 pm or more). Furthermore, each of the low temperature treatment in the low temperature range of −40° C. or lower and the high temperature treatment in the high temperature range of 20 to 200° C. was performed on the optical communication device of Comparative Example 6 only once. As a result, the thermal expansion hysteresis of the optical communication device substrate was large (16 ppm or more), and the center reflective wavelength hysteresis of the optical communication device was also large (24 pm or more).

In addition, as is apparent from FIG. 4, the optical communication device of Comparative Example 1 had a large temperature-dependent variation amount as a result of the temperature cycle test as the long-term reliability test. As in the case of the optical communication device of Comparative Example 1, the optical communication device of each of Comparative Examples 2 to 6 had a large temperature-dependent variation amount as a result of the temperature cycle test as the long-term reliability test.

INDUSTRIAL APPLICABILITY

The optical communication device substrate according to the present invention has a negative thermal expansion coefficient the absolute value of which is sufficiently large, exhibits small thermal expansion hysteresis, and is thus excellent in long-term durability. Therefore, an optical communication device obtained by fixing an FBG onto the substrate allows temperature compensation to be sufficiently performed even when the device is exposed to high-temperature and high-humidity atmosphere for a long period of time, and can reduce the center reflective wavelength hysteresis due to the FBG to 20 pm or less. For example, the substrate according to the present invention qualifies as an optical communication device substrate for a wavelength division multiplex transmission system in which light with different wavelengths are simultaneously transmitted in order to transfer an increased amount of information at one time.

What is claimed is:

1. An optical communication device substrate, comprising one of ceramic and glass ceramic each having an average thermal expansion coefficient of −55 to −120×$10^{-7}$/C. in the temperature range of −40 to +100°C. and each containing one of a β-quartz solid solution and a β-eucryptite solid solution as a main crystal, wherein maximum thermal expansion hysteresis that occurs when temperature rise from −40°C. to 100°C. at a rate of 1 C.°/min and temperature lowering from 100°C. to −40°C. at a rate of 1°C./min are performed is less than 12 ppm.

2. An optical communication device substrate according to claim 1, wherein a difference between a maximum value and a minimum value out of average thermal expansion coefficients calculated for each of 7 sections, the sections being obtained by dividing the temperature range of −40°C. to 100°C. every 20 C°, is 6×$10^{-7}$/C. or less whe temperature is lowered from 100°C.to −40°C. at a rate of 1 C.°/min.

3. An optical communication device substrate according to claim 2, wherein the substrate contains 45 to 60 mass % $SiO_2$, 20 to 45 mass % $Al_2O_3$, 7 to 12 mass % $Li_2O$, 0 to 4 mass % $TiO_2$, and 0 to 4 mass % $ZrO_2$.

4. An optical communication device substrate according to claim 3, wherein a molar ratio of $Li_2O:Al_2O_3:SiO_2$ is 1:1.5 to 2.5:2 to 3.

5. An optical communication device obtained by fixing an optical component having a positive thermal expansion coefficient onto the optical communication device substrate according to claim 4.

6. An optical communication device obtained by fixing an optical component having a positive thermal expansion coefficient onto the optical communication device substrate according to claim 4.

7. An optical communication device obtained by fixing an optical component having a positive thermal expansion coefficient onto the optical communication device substrate according to claim 2.

8. An optical communication device substrate according to claim 1, wherein the substrate contains 45 to 60 mass % $SiO_2$, 20 to 45 mass % $Al_2O_3$, 7 to 12 mass % $Li_2O$, 0 to 4 mass % $TiO_2$, and 0 to 4 mass % $ZrO_2$.

9. An optical communication device substrate according to claim 8, wherein a molar ratio of $Li_2O:Al_2O_3:SiO_2$ is 1:1.5 to 2.5:2 to 3.

10. An optical communication device obtained by fixing an optical component having a positive thermal expansion coefficient onto the optical communication device substrate according to claim 9.

11. An optical communication device obtained by fixing an optical component having a positive thermal expansion coefficient onto the optical communication device substrate according to claim 8.

12. An optical communication device obtained by fixing an optical component having a positive thermal expansion coefficient onto the optical communication device substrate according to claim 1.

13. A method of manufacturing an optical communication device substrate, the substrate including one of ceramic and glass ceramic each having an average thermal expansion coefficient of $-55$ to $-120 \times 10^{-7}$°/C. in the temperature range of $-40$ to 100°C. and each containing one of a β-quartz solid solution and β-eucryptite solid solution as a main crystal, the method comprising performing, on the substrate, high temperature treatment at the temperature of 20°C. or higher and low temperature treatment at the temperature of 20°C. or lower alternately, each of the high temperature treatment and the low temperature treatment being performed multiple times, wherein the difference between the temperature at which the high temperature treatment is performed and the temperature at which the low temperature treatment is performed is in a range of 40 to 240° C.

14. A method of manufacturing an optical communication device substrate according to claim 13, wherein low temperature treatment at the temperature of $-40$°C. or lower and high temperature treatment in the temperature range of 20 to 200°C. are performed on the substrate alternately, each of the low temperature treatment and the high temperature treatment being performed multiple times.

15. A method of manufacturing an optical communication device substrate according to claim 14, wherein each of a time for one isothermal retention at the temperature of $-40$°C. or lower and a time for one isothermal retention in the temperature range of 20 to 200°C. is 60 minutes or less.

\* \* \* \* \*